United States Patent [19]

Himes et al.

[11] 4,216,131

[45] Aug. 5, 1980

[54] SMOOTH-LOOK FOOTWEAR COMPOSITION

[75] Inventors: Glenn R. Himes; Judith E. Zweig, both of Houston, Tex.

[73] Assignee: Shell Oil Company, Houston, Tex.

[21] Appl. No.: 35,980

[22] Filed: May 4, 1979

[51] Int. Cl.² .............................................. C08K 5/01
[52] U.S. Cl. .............................. 260/33.6 AQ; 36/87; 260/42.47; 525/89
[58] Field of Search .................... 260/42.47, 33.6 AQ; 525/89

[56] References Cited

U.S. PATENT DOCUMENTS

| | | | |
|---|---|---|---|
| Re. 28,236 | 11/1974 | Hendricks et al. | 36/87 |
| 3,424,649 | 1/1969 | Nyberg et al. | 525/89 |
| 3,459,830 | 8/1969 | Legge et al. | |
| 3,562,356 | 2/1971 | Nyberg et al. | |
| 3,594,452 | 7/1971 | De La Mare et al. | |
| 4,039,629 | 8/1977 | Himes et al. | 525/89 |

*Primary Examiner*—Lewis T. Jacobs
*Attorney, Agent, or Firm*—Dean F. Vance

[57] ABSTRACT

A non-delaminating polymeric composition having a smooth appearance along with improved solvent resistance comprises a mixture of particular linear and radial monoalkenyl arene-diene block copolymers, a low density polyethylene, ethylene/vinyl acetate copolymer, hydrocarbon extending oil and filler. The block copolymers, polyethylene and ethylene/vinyl acetate copolymer are selected such that essentially isoviscous melt blending conditions are attained.

10 Claims, No Drawings

SMOOTH-LOOK FOOTWEAR COMPOSITION

BACKGROUND OF THE INVENTION

The use of certain block copolymers and their compounds in a number of end-uses and especially in footwear, is rapidly expanding. For example, in the footwear industry, certain block copolymer compounds are being used in large volume in the manufacture of a wide variety of shoes including canvas shoes, sport shoes, and dress shoes. The block copolymers may be utilized for this purpose for soling, foxing, innersles and the like. These compositions are disclosed in Hendricks et al, U.S. Pat. No. Re. 28,236. In general, these shoe component compositions usually comprise a mixture of block copolymer, extending oil, polystyrene and possibly a filler. For the most part, these block copolymer compositions have proven to be particularly advantageous in many respects, including flexibility, processability, lack of vulcanization requirement and wet slip. However, in certain respects, shortcomings have been noted. For example, commercial compounds should be free from delamination, free from elephant hide, and free from flow markings and marring. With respect to many styles in the casual and dress shoe areas of footwear, one of the major shortcomings of the block copolymer compounds such as those referred to in U.S. Pat. No. Re. 28,236 is the lack of a smooth appearance. Present block copolymer compounds lack the smooth, relatively unblemished surface which is characteristic of compression molded vulcanized conventional rubber, injection molded poly(vinyl chloride) or leather. A new composition has now been found that not only has a smooth appearance, but also is non-delaminating and has improved solvent resistance.

SUMMARY OF THE INVENTION

The present invention is a composition eminently suitable for footwear application comprising:

(a) 100 parts by weight of a mixture of a linear ABA block copolymer and a radial $(AB)_x$ BA block copolymer where x is greater than 1, the weight ratio of linear to radial block copolymer is between about 25/75 and about 90/10, each block A has an average molecular weight between about 5,000 and 25,000, each block B has an average molecular weight between about 15,000 and about 300,000, and said blocks A comprise 8–65% by weight of each copolymer; p (b) about 10 to about 50 parts by weight of a low density polyethylene having a melt flow index at 190° C. between about 0.4 and 5 and a density below 0.94 $g/cm^3$;

(c) about 5 to about 100 parts by weight of an ethylene/vinyl acetate copolymer having a melt flow index at 190° C. between about 0.1 and 8;

(d) about 0 to about 200 parts by weight of a hydrocarbon rubber extending oil; and (e) about 0 to about 250 parts by weight of a finely divided filler.

It is important that the block copolymers, polyethylene and ethylene/vinyl acetate copolymer be melt blended under essentially isoviscous melt blending conditions. Accordingly, in selecting the particular polymers, it is preferred that the ratio of the melt viscosity of each of the polymers in the blend be between about 0.1 and 10, more preferably about 1 and 3, at the shear rate and temperature range employed.

The resulting composition is especially suitable in unit soles for dress shoes and many styles of casual shoes since it has a smooth appearance similar to that of conventional rubber and some types of PVC soles. In addition, the present compositions are non-delaminating and possess improved solvent resistance.

Each of the various components herein employed is significant. The block copolymers must have certain styrene block molecular weights. Below 5000 molecular weight, domain formation does not occur, and therefore the block copolymers will not possess true thermoplastic elastomeric properties. Above 25,000 molecular weight, it is not possible to blend the block copolymers with the other polymers and obtain a non-delaminating blend.

It has also been found that similar equal hardness blends containing low density polyethylene but no ethylene/vinyl acetate copolymer are not desirable since they tend to delaminate.

DETAILED DESCRIPTION OF THE INVENTION

The block copolymer component of the present invention is a mixture of a linear ABA type block copolymer and a radial $(A-B)_x$B-A block copolymer where x is over one. Preferably, x varies from over 1 to 15, more preferably from about 2 to about 6. The A blocks are monoalkenyl arene polymer blocks and the B blocks are elastomeric conjugated diene polymer blocks. Typical linear block copolymers have the structure polystyrene-polybutadiene-polystyrene. A typical radial polymer would comprise one in which the diene block has three or more branches, the tip of each branch being connected to a polystyrene block. See U.S. Pat. No. 3,594,452. Other useful monoalkenyl arenes from which the thermoplastic (non-elastomeric) blocks may be formed include alphamethyl styrene, tert-butyl styrene and other ring alkylated styrenes as well as mixtures of the same. The conjugated diene monomer preferably has 4 to 5 carbon atoms, such as butadiene and isoprene.

The use of both a linear and a radial block copolymer results in improved properties for the mixture compared to the use of just a linear copolymer or just a radial copolymer. The radial copolymer contributes needed strength to the mixture and reduces delamination tendencies. The linear polymer promotes blending and flow. The weight ratio of linear to radial block copolymer may vary from about 25/75 to about 90/10, preferably from about 40/60 to about 85/15.

The average molecular weights of each of the blocks may be varied as desired. The monoalkenyl arene polymer blocks preferably have number average molecular weights between about 5,000 and about 25,000, more preferably between about 8,000 and about 20,000. The elastomeric conjugated diene polymer blocks preferably have number average molecular weights between about 15,000 and about 300,000, more preferably between about 25,000 and about 150,000. The average molecular weights of the polystyrene end blocks are determined by gel permeation chromatography, whereas the polystyrene content of the polymer is measured by infrared spectroscopy of the finished block polymer. The weight percentage of the thermoplastic monoalkenyl arene blocks in the finished block polymer should be between about 8 and 65%, preferably between about 20% and about 35% by weight. The general type and preparation of these block copolymers are described in U.S. Pat. No. Re. 28,246 and in many other U.S. and foreign patents.

The low density polyethylenes useful herein should have melt indices between about 0.4 and 5 and a density below 0.94 grams per cubic centimeter (g/cm$^3$). Melt index is important in that it relates to the viscosity characteristics of the polyethylene. It is important that the viscosity of the polyethylene, block copolymer component and ethylene/vinyl acetate copolymer at the melt blending temperature and shear rate employed in blending have the ratio limitations as discussed above.

The process by which these polyethylenes are prepared does not form a part of the present invention. They may, in fact, be prepared by any of the well-known methods such as those described in the book "Polyethylene" by Raff and Allison, Interscience Publishers (1956). See also the Kirk-Othmer Encyclopedia of Science and Technology, Volume 14, pages 217-241 (2nd ed. 1967).

The amount of polyethylene employed varies from about 5 phr (parts by weight per hundred parts by weight rubber, or block copolymer as in this case) to about 50 phr, preferably around 25 phr.

The ethylene-vinyl acetate copolymers which are to be used in the compositions of the invention correspond to the general formula

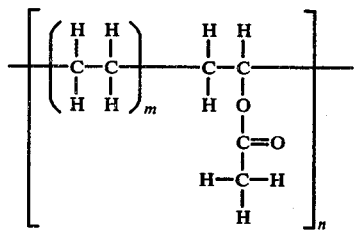

wherein n ranges from about 15 to about 250. The actual occurrence of the acetate substituents along the hydrocarbon chain is of a random character and thus the letter m denotes the average number of ethylene units per vinyl acetate unit in the molecule rather than the presence of regularly recurrent units having the composition given within the above brackets. The value for m ranges from about 6.5 to 40 and preferably from about 7.5 to 30. The latter values for m correspond to a vinyl acetate content in the copolymer of approximately 29 to 9% by weight, respectively. The useful melt indices range from about 0.1 to about 8 grams per 10 minutes. Excellent copolymers are DuPont's Alathon 3135, which has a melt index of 0.3 and contains about 12% vinyl acetate, and Alathon 3175, which has a melt index of 6 and contains about 28% vinyl acetate.

The amount of ethylene-vinyl-acetate copolymer employed in the present composition ranges from about 5 to about 100 phr, preferably between about 5 and about 50 phr. As with the polyethylene, it is important that the viscosity of the ethylene-vinyl acetate copolymer be similar to that of the ethylene and the block copolymer components.

The hydrocarbon rubber extending oils, usually referred to as paraffinic/naphthenic oils, are usually fractions of refined petroleum products having less than about 30% by weight of aromatics (by clay-gel analysis) and usually have viscosities between about 100 and 500 SSU at 100° F. Commercial extending oils include SHELLFLEX® oils, Nos. 310, 371 and 311 (which is a blend of 310 and 371). The amount of extending oil employed varies from about 0-200 phr, preferably from about 25-100 phr.

The fillers used in the present compositions are well known in the art and include clay, talc, silica, titanium dioxide, carbon blacks, calcium carbonate, and other pigments as well as fibrous fillers such as cellulosic fibers, sawdust, ground cork, etc. Preferred fillers include silica and calcium carbonate. The amount of filler employed varies from 0-250 phr, preferably 5-60 phr. Additional minor amounts of antioxidants, ultra-violet stabilizers and the like may also be added.

The components of this invention may be combined by processes known in the art including blending such as by extrusion, Banbury mixing or by dry-blending procedures. In the latter case, it is preferred that the block copolymer and other polymers be formed or ground in particles having an average size less than about 4 millimeter diameter into which the extending oil is absorbed. Following this, the remaining powdered components may be added and vigorously dry-blended therewith such as in well-known dry-blending equipment long used in the PVC dry-blending art. Preferably, however, the various components are melt blended.

While the present specification emphasizes the use of these compositions in footwear components, other end-uses also are contemplated. These include, for example, automotive parts and wire and cable coatings. Tubular products such as hoses and the like also are contemplated.

The use of the present composition in footwear includes especially their use in soling when prepared by injection molding and slab soling, such as produced by cutting shoe sole forms from extruded slabstock. The advantages of the present compositions are most apparent in injection molding of unit soles which are later attached by adhesion or sewing to uppers. In this situation, it has been found that the unit soles are readily removed from the injection mold at cycle times comparable to the compounds referred to in U.S. Pat. No. Re. 28,236 and have reduced weld line formation on the surface. The unit sole is free of the elephant hide phenomenon, which is a wrinkling of the surface on the side of the sole which is concave to the observer when the sole is flexed. This objectionable phenomenon is a common and troublesome characteristic of prior art block copolymer compounds. Unit soles of the present invention are also much more resistant to surface marring and scuffing than prior art compounds. Furthermore, the sole so produced is resistant to delamination and has a smooth appearance. These unit soles (which term refers in the trade to a sole including an integral heel portion) are useful both as a leather replacement and as an improvement over the prior art vinyl soles. The compositions also may be used in the manufacture of injection molded canvas shoe soles wherein the soling is directly injection molded onto the canvas upper which may be canvas or various natural and synthetic fibers, including leather, vinyl and polymeric materials. In some cases pre-coating of the upper with a primer is required to effect adhesion.

The invention is further illustrated by means of the following comparative examples and illustrative embodiment, which are given for the purpose of illustration alone and are not meant to limit the invention to the particular reactants and amounts disclosed.

COMPARATIVE EXAMPLE I

In Comparative Example I, various compositions were prepared outside the scope of the present invention. In all examples, the block copolymer employed was a linear styrene-butadiene-styrene block copolymer having a molecular weight distribution according to the present invention. The polyethylene employed was a low melt flow, low density polyethylene having a melt index of 1 (gram per 10 minutes) and a density of 0.919 g/cm$^3$. The oil employed was SHELLFLEX® 311 hydrocarbon oil. All examples contained a standard antioxidant-inhibitor package.

The individual components were mixed on a Banbury Mixer at about 325° F. for a total mix time of about 3 minutes.

Samples of the various compositions were tested according to the following tests:

| Test | Standard Test Number |
| --- | --- |
| Shore A Hardness | D-2240 |
| Tinius Olsen Stiffness | D-747 |
| Taber Abrasion | D-1044 |
| Ross Cut Growth | D-1052 |

The various formulations and test results are presented below in Table 1. These compounds are unacceptable in unit soles because of some tendency to delaminate and poor adhesion.

Table 1

| Composition #, (parts by weight) | 201 | 202 | 203 | 204 | 205 | 206 |
| --- | --- | --- | --- | --- | --- | --- |
| Block Copolymer #1 | 100 | 100 | 100 | 100 | 100 | 100 |
| Polyethylene | 25 | 50 | 25 | 25 | 25 | 25 |
| Extending oil | 25 | 25 | 50 | 50 | 42 | 50 |
| SiO$_2$ filler | — | — | — | 25 | — | 10 |
| CaCO$_3$ filler | 15 | 15 | 25 | — | 25 | 15 |
| Additive package | 0.6 | 0.6 | 0.6 | 0.6 | 0.6 | 0.6 |
| Total parts | 165.6 | 190.6 | 200.6 | 200.6 | 192.6 | 200.6 |
| Test Results | | | | | | |
| Shore A Hardness (injection molded) | | | | | | |
| Instantaneous | 66 | 73 | 57 | 60 | 58 | 57 |
| 10 sec. | 63 | 66 | 54 | 57 | 53 | 54 |
| Taber abrasion, cc | 0.756 | 0.970 | 1.055 | 1.026 | 0.874 | 0.887 |
| Tinius Olsen Stiffness, PSI | 970 | — | 515 | 671 | — | 468 |
| Ross Flex Cut Growth, thousand flexes to 500% growth | 455 | — | 500 | 1825 | — | 330 |
| Melt Flow, Cond. E., g/10 min. | 11 | — | 38 | 18 | 29 | 24 |
| Adhesion (peel strength), KN/m | 5.3 | — | 4.0 | 1.7 | — | 4.4 |
| Trouser Tear Strength (parallel/normal to flow) KN/m | 29.0/24.7 | — | 15.8/13.4 | 23.8/17.5 | — | 16.0/14.6 |
| Delamination Tendency | non-delaminating | delaminates | delaminates with difficulty | delaminates with difficulty | delaminates with difficulty | delaminates with difficulty |

COMPARATIVE EXAMPLE II

In Comparative Example II, various compositions were prepared with the same block copolymer, oil and polyethylene as in Comparative Example I. However, in Comparative Example II, an ethylene/vinyl acetate copolymer (EVA) was added to the blend. EVA #1 has a melt index of 0.3 and a vinyl acetate content of 12% while EVA #2 has a melt index of 6 and a vinyl acetate content of 28%. The various formulations and test results are presented below in Table 2. The compositions of Comparative Example II are unacceptable in unit soles because of low flex crack resistance, poor adhesion and low tear strength.

Table 2

| Composition # (parts by weight) | 213-G | 213-GS | 213-GS2 |
| --- | --- | --- | --- |
| Block Copolymer #1 | 100 | 100 | 100 |
| Polyethylene | 25 | 20 | 20 |
| EVA #1 | 10 | 10 | — |
| EVA #2 | — | — | 10 |
| Extending oil | 50 | 60 | 60 |
| SiO$_2$ filler | 25 | 25 | 25 |
| Additive package | 1.6 | 1.6 | 1.6 |
| Total parts | 211.6 | 216.6 | 216.6 |
| Test Results | | | |
| Shore A Hardness (injection molded) | | | |
| Instantaneous | 69 | 65 | 57 |
| 10 sec. | 64 | 60 | 53 |
| Taber Abrasion, cc/kc | 0.64 | 0.72 | 0.84 |
| Tinius Olsen Stiffness, psi | 890 | 680 | 490 |
| Ross Flex Cut Growth, thousand flexes to 500% growth | 163 | 246 | 115 |
| Melt Flow, Cond. E, g/10 min. | 14 | 30 | 21 |
| Trouser Tear Strength (parallel/normal to flow), KN/m | 16.5/18.2 | 13.0/14.5 | 10.5/11.7 |
| Adhesion (peel strength), KN/m | 6.1 | 6.3 | 5.4 |
| Delamination Tendency | Non-delaminating | Non-delaminating | Non-delaminating |

ILLUSTRATIVE EMBODIMENT I

In Illustrative Embodiment I, various compositions were prepared both according to the present invention and outside the present invention. In Composition #

H-11, the block copolymer #2 was a radical styrene-butadiene block copolymer having styrene block molecular weights outside the range claimed in the present invention. Block copolymers numbered 3, 4 and 5 are radial styrene-butadiene block copolymers having molecular weights within the range of the present invention. Block copolymer #1 is the same as that employed in Comparative Examples I and II, i.e., an SBS linear block copolymer. The compositions of the present invention (H-27, 28, 23, 30 and 29) all have nil weld line visibility, good mar resistance, nil elephant hide, and good, uniform surface dullness. The shoe soles produced from composition H-11 (outside the present invention) had an inferior surface appearance consisting of random shiny and dull areas and had poor adhesion characteristics. The compositions not containing a linear block copolymer (H-18, 19 and 20) were inferior because of poor flow and/or random shiny and dull areas.

The various formulations and test results are presented below in Table 3.

Table 3

| Composition #, (parts by weight) | H-11 | H-27 | H-28 | H-23 | H-30 | H-29 | H-18 | H-19 | H-20 |
|---|---|---|---|---|---|---|---|---|---|
| Block Copolymer #1 | 50 | 75 | 75 | 75 | 87.5 | 50 | — | — | — |
| Block Copolymer #2 | 77 | — | — | — | — | — | — | — | — |
| Block Copolymer #3 | — | 25 | — | — | — | — | — | 100 | — |
| Block Copolymer #4 | — | — | 25 | — | — | — | — | — | 100 |
| Block Copolymer #5 | — | — | — | 34 | 17 | 68 | 100 | — | — |
| Extending Oil | 57 | 65 | 65 | 56 | 60.5 | 47 | 60 | 60 | 60 |
| Polyethylene | 20 | 20 | 20 | 20 | 20 | 20 | 20 | 20 | 20 |
| EVA #2 | 10 | 10 | 10 | 10 | 10 | 10 | 10 | 10 | 10 |
| Poly(alphamethylstyrene) | — | 20 | 20 | 20 | 20 | 20 | — | — | — |
| Silica Filler | 25 | 25 | 25 | 25 | 25 | 25 | 25 | 25 | 25 |
| Additive package | 1.6 | 1.6 | 1.6 | 1.6 | 1.6 | 1.6 | 0.6 | 0.6 | 0.6 |
| Total parts | 240.6 | 241.6 | 241.6 | 241.6 | 241.6 | 241.6 | 215.6 | 215.6 | 215.6 |
| Test Results | | | | | | | | | |
| Shore A Hardness (injection molded) | | | | | | | | | |
| Instantaneous | 54 | 58 | 58 | 56 | 57 | 58 | 73 | 57 | 61 |
| Taber Abrasion, cc/kc | 1.12 | 0.90 | 0.89 | 0.82 | 0.80 | 0.58 | 0.83 | 0.77 | 0.69 |
| Tinius Olsen Stiffness, psi | 500 | 410 | 420 | 470 | 390 | 520 | — | — | — |
| Ross Flex Cut Growth, (thousand flexes to 500% growth) | 772 | 223 | 218 | 690 | 306 | 623 | — | — | — |
| Melt Flow, Cond. E, g/10 min. | 11 | 28 | 19 | 12 | 21 | 5.4 | 5.6 | 10 | 0.4 |
| Trouser Tear Strength | 11.6 | 11.9 | 12.4 | 18.2 | 13.1 | 20.5 | 19.3 | 11.7 | 14.5 |
| (parallel/normal to flow), KN/m | 12.3 | 10.3 | 12.3 | 17.5 | 13.8 | 19.6 | 20.2 | 12.1 | 17.7 |
| Adhesion (peel strength), KN/m | 4.0 | 6.7 | 6.8 | 8.6 | 6.7 | 10.3 | — | — | — |
| Delamination Tendency | None | None | None | None | None | None | — | — | — |

We claim as our invention:

1. A non-delaminating polymeric composition comprising:
   (a) 100 parts by weight of a mixture of a linear ABA block copolymer and a radial (AB$\rightarrow$)$_x$BA block copolymer where x is greater than 1, the weight ratio of linear to radial block copolymer is between about 25/75 and about 90/10, each block A being a monoalkenyl arene polymer having an average molecular weight between about 5,000 and 25,000, each block B being an elastomeric conjugated diene polymer having an average molecular weight between about 15,000 and about 300,000, and said blocks A comprise 8–65% by weight of each copolymer;
   (b) about 10 to about 50 parts by weight of a low density polyethylene having a melt flow index at 190° C. between about 0.4 and 5 and a specific gravity below 0.94;
   (c) about 5 to about 100 parts by weight of an ethylene/vinyl acetate copolymer having a melt flow index at 190° C. between about 0.1 and 8;
   (d) about 0 to about 200 parts by weight of a hydrocarbon rubber extending oil; and
   (e) about 0 to about 250 parts by weight of a finely divided filler.

2. A composition according to claim 1 wherein said A block is a polystyrene block and said B block is a polybutadiene block.

3. A composition according to claim 1 wherein said block copolymers, polyethylene and ethylene/vinyl acetate copolymer are melt blended under essentially isoviscous melt blending conditions.

4. A composition according to claim 3 wherein the amount of said polyethylene is about 25 parts by weight.

5. A composition according to claim 1 wherein said ethylene/vinyl acetate copolymer has the general formula

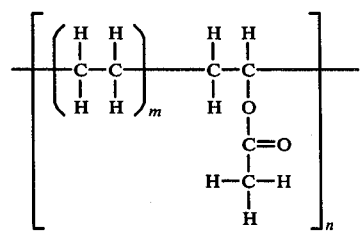

where n ranges from about 15 to about 250 and m ranges from about 6.5 to about 40.

6. A composition according to claim 5 wherein the ethylene/vinyl acetate copolymer has a melt flow index of about 0.3 grams per 10 minutes and a vinyl acetate content of about 12%.

7. A composition according to claim 5 wherein said ethylene/vinyl acetate copolymer has a melt flow index of about 6 grams per 10 minutes and a vinyl acetate content of about 28%.

8. A composition according to claims 6 or 7 wherein said polyethylene has a melt flow index of about 1.0 and a specific gravity of 0.92.

9. A composition according to claim 1 wherein said filler is selected from the group consisting of calcium carbonate and silica.

10. A shoe sole having the composition of claim 1.

* * * * *